United States Patent
Den Boestert et al.

(10) Patent No.: US 7,722,758 B2
(45) Date of Patent: May 25, 2010

(54) PROCESS FOR SEPARATING COLOUR BODIES AND/OR ASPHALTHENIC CONTAMINANTS FROM A HYDROCARBON MIXTURE

(75) Inventors: Johannes Leendert Willem Cornelis Den Boestert, Amsterdam (NL); Jeroen Van Westrenen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 282 days.

(21) Appl. No.: 11/664,970

(22) PCT Filed: Oct. 10, 2005

(86) PCT No.: PCT/EP2005/055121

§ 371 (c)(1),
(2), (4) Date: Apr. 9, 2007

(87) PCT Pub. No.: WO2006/040307

PCT Pub. Date: Apr. 20, 2006

(65) Prior Publication Data

US 2009/0014359 A1    Jan. 15, 2009

(30) Foreign Application Priority Data

Oct. 11, 2004   (EP)   .................................. 04104971

(51) Int. Cl.
    *C10C 1/08*   (2006.01)
(52) U.S. Cl. .................. 208/309; 210/321.83; 210/650; 210/651; 210/652

(58) Field of Classification Search .................. 208/309; 585/818; 210/637, 641, 650–655, 321.83
See application file for complete search history.

(56) References Cited

U.S. PATENT DOCUMENTS

| 5,096,584 | A | * | 3/1992 | Reddy et al. ............ 210/321.74 |
| 5,250,118 | A |   | 10/1993 | Netwig et al. ............... 134/22.1 |
| 5,275,726 | A | * | 1/1994 | Feimer et al. .......... 210/321.74 |
| 5,458,774 | A |   | 10/1995 | Mannapperuma ...... 210/321.83 |
| 5,785,860 | A |   | 7/1998 | Smith ........................ 210/651 |

FOREIGN PATENT DOCUMENTS

| WO | WO9927036 | 6/1999 |
| WO | WO03035803 | 5/2003 |
| WO | WO2004092308 | 10/2004 |

OTHER PUBLICATIONS

International Search Report Jan. 19, 2006.

* cited by examiner

*Primary Examiner*—Robert J Hill, Jr.
*Assistant Examiner*—Brian McCaig
(74) *Attorney, Agent, or Firm*—Charles W. Stewart

(57) ABSTRACT

Process for separating colour bodies and/or asphalthenic contaminants from a hydrocarbon mixture using a membrane having a feed side and a permeate side, by contacting the hydrocarbon mixture with the feed side of the membrane, and by removing at the permeate side a hydrocarbon permeate having a reduced content of colour bodies and/or asphalthenic contaminants, wherein the membrane is arranged in a spirally wound membrane module.

19 Claims, 4 Drawing Sheets

PROCESS FOR SEPARATING COLOUR BODIES AND/OR ASPHALTHENIC CONTAMINANTS FROM A HYDROCARBON MIXTURE

RELATED APPLICATIONS

The present application claims priority from European Patent Application No. 04104971.9 filed 11 Oct. 2004, which is herein incorporated by reference in its entirety.

FIELD OF THE INVENTION

The invention is directed to a process for separating colour bodies and/or asphalthenic contaminants from a hydrocarbon mixture using a membrane, by passing part of the hydrocarbon mixture from a feed side to a permeate side of the membrane, and by removing at the permeate side of the membrane a hydrocarbon permeate having a reduced-content of colour bodies and/or asphalthenic contaminants.

BACKGROUND OF THE INVENTION

Such a process has been developed in the past by the applicant of the present invention, and reference is made for example to the International Patent application with publication No. WO 99/27036, International Patent application with publication No. WO 03/035803, and International Patent application No. PCT/EP2004/050507 (not published at the priority date of the present application).

WO 99/27036 discloses a process for preparing lower olefins by means of the well-known steam cracking process from a contaminated feedstock. Prior to feeding the feedstock to the steam cracker furnaces the contaminants are removed from the feedstock by means of a membrane separation. By removing contaminants from the feed in this manner it is possible to use, for example, so-called black condensates as feedstock for preparing lower olefins. The term black condensates is commonly used to refer to contaminated natural gas condensates having an ASTM colour of 3 or more. Direct application of these relatively cheap feedstocks in the above steam cracker process would not be possible because the contaminants and/or colour bodies in the feed would give rise to excessive coke formation in convection sections and associated steam cracker furnaces.

The contaminants and/or colour bodies are typically high molecular polynuclear hydrocarbons, which can be present in quantities of several wt % in the hydrocarbon mixture at high colour indices. In testing the process according to WO 99/27036 in a plate-and-frame membrane separation unit it was found that the flux, expressed in feed permeating through the membrane per square meter per day decreased quickly from a maximum value of around for example 1200 kg/(m$^2$·day) to non-economical lower values, and this is attributed to fouling of the membrane surface at the feed side, due to deposition of colour bodies and/or asphalthenes.

International patent application with publication No. WO 03/035803 describes a process to separate colour bodies and/or asphalthenic contaminants from a hydrocarbon mixture by passing part of the hydrocarbon mixture through a membrane over which membrane a pressure difference is maintained thereby obtaining a hydrocarbon permeate having a reduced content of colour bodies and/or contaminants, wherein at selected time intervals the pressure difference over the membrane is substantially lowered by stopping the flow of the hydrocarbon mixture to the feed side of the membrane. Stopping the feed flow can for example be achieved by stopping the operation of a feed pump, or by recycling the hydrocarbon mixture from a position between the feed pump and the membrane to a position upstream of the feed pump. When the membrane operation is resumed after stopping the feed flow, a high permeate flux is observed again.

International patent application No. PCT/EP2004/050507 describes a process for separating colour bodies and/or asphalthenic contaminants from a hydrocarbon mixture using a membrane having a feed side and a permeate side, by contacting the hydrocarbon mixture with the feed side of the membrane, wherein between the feed and permeate sides of the membrane a pressure difference is applied, thereby passing part of the hydrocarbon mixture from the feed side to the permeate side and obtaining at the permeate side of the membrane a hydrocarbon permeate having a reduced content of colour bodies and/or asphalthenic contaminants, and by removing the hydrocarbon permeate from the permeate side of the membrane, wherein during selected time intervals the removal of hydrocarbon permeate from the permeate side of the membrane is stopped so that the pressure difference over the membrane is temporarily substantially lowered. When the membrane operation is resumed again, it was found that permeate can be removed at high flux again.

Therefore, stopping the feed flow as in WO 03/035803, or stopping the permeate flow as in PCT/EP2004/050507, both allowed to operate the membrane separation unit over extended periods of time continuously, without having to replace or take the membrane unit off-line for cleaning.

U.S. Pat. No. 5,785,860 discloses another method for removing asphalthenes from heavy oil, wherein the heavy oil is fed through a ceramic membrane, and wherein the initially large pore size of the ceramic membrane is first reduced by deliberate fouling, following which asphalthenes can be removed for some further time, until the pores are completely blocked.

It is an object of the present invention to provide a membrane separation process for removing colour bodies and/or asphalthenes from a hydrocarbon mixture that allows to operate the membrane unit full-continuous over extended periods of time, and without the need for regular stopping of feed or permeate flux at a time scale of hours.

SUMMARY OF THE INVENTION

In accordance with the present invention there is provided a process for separating colour bodies and/or asphalthenic contaminants from a hydrocarbon mixture using a membrane having a feed side and a permeate side, by contacting the hydrocarbon mixture with the feed side of the membrane, and by removing at the permeate side a hydrocarbon permeate having a reduced content of colour bodies and/or asphalthenic contaminants, wherein the membrane is arranged in a spirally wound membrane module.

BRIEF DESCRIPTION OF THE DRAWINGS

The invention will be described in more detail and by means of a non-limiting example and comparative example, with reference to the Figures, wherein FIG. 1 schematically shows a spirally wound membrane module.

DETAILED DESCRIPTION OF THE INVENTION

Figure 1:
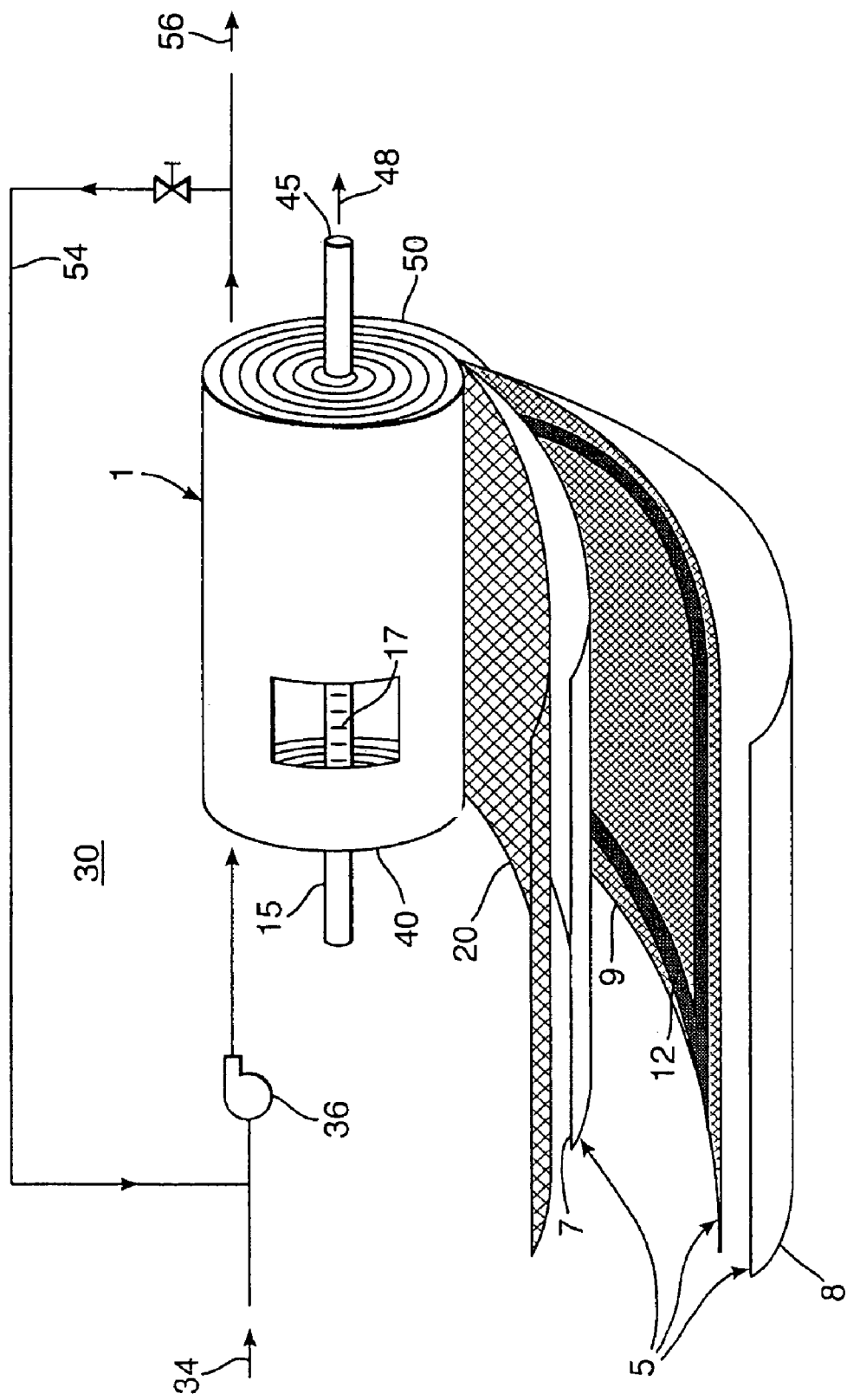

Membrane modules in a spirally wound membrane are well known for applications in aqueous systems such as waste water streams and water desalination. A spirally wound membrane module typically comprises a membrane assembly of two membrane sheets between which a permeate spacer sheet is sandwiched, and which membrane assembly is sealed at three sides. The fourth side is connected to a permeate outlet conduit such that the area between the membranes is in fluid communication with the interior of the conduit. On top of one of the membranes a feed spacer sheet is arranged, and the assembly with feed spacer sheet is rolled up around the permeate outlet conduit, to form a substantially cylindrical spirally wound membrane module. During normal operation, a feed mixture is passed from one end of the cylindrical module between the membrane assemblies, along the feed spacer sheet sandwiched between feed sides of the membranes. Part of the feed mixture passes through either one of the membrane sheets to the permeate side, and permeate thus obtained flows along the permeate spacer sheet into the permeate outlet conduit from which it is removed.

Fouling and associated reduction in permeate flux is a well-known problem in membrane separations. Separation of colour bodies and/or asphalthenes from a hydrocarbon mixture is a task that is highly prone to membrane fouling, due to the nature (chemical, molecular weight) of the contaminants removed and because of the quantities of contaminants involved, typically at least 1 wt % or the total mixture, and can go up to 5 wt %, 10 wt % or even more. Before making the present invention, a person skilled in the art of membrane separations would not have considered using a spirally wound membrane module in such a process, since the space available for the feed between membrane sheets and along the feed spacer sheet is so limited that accumulation of colour bodies and/or asphalthenes fouling would result in fast degradation of membrane performance. U.S. Pat. No. 5,458,774 states for example that the major disadvantage of the spiral configuration is its inability to accommodate suspended particulate matter due to fouling of the feed spacer grid. Also in U.S. Pat. No. 5,250,118 it is observed that a significant problem with spirally wound cartridges is fouling of the feed spacer which results in subsiding permeate output or even unusable cartridges.

Applicant has surprisingly found that a spirally wound membrane module actually allows high permeate flux to be maintained over extended periods of time in the separation of asphalthenes and/or colour bodies from a hydrocarbon mixture. It has been found to exhibit in fact far better performance than a plate-and-frame module. The module can be operated without the need for regular interruption of feed or permeate flow, respectively, or other cleaning operations for periods much longer than just about one hour like in the prior art, e.g. for 10 hours, one day, one week, or even longer. During the period of continuous operation the permeate flux rate does suitably not decrease to lower values than 50% of the initial flux, preferably not lower than 70%, most preferably not lower than 90%.

Without wanting to limit the invention in any manner, it is believed that the higher turbulence at the membrane feed side compared to a plate-and-frame module, caused by the presence of the feed spacer, helps to prevent deposition of contaminants on the membrane.

Preferably the feed spacer has a thickness of at least 0.6 mm, more preferably at least 1 mm, to provide sufficient space at the feed side, and typically a maximum thickness of 3 mm to allow sufficient membrane surface to be packed into a spirally wound module.

The feed spacer suitably represents a grid of openings defined by strands and bonds (the corner points between strands).

Suitably the strands form an angle of 80 degrees or less with the longitudinal direction of the spirally wound membrane module, preferably 70 degrees or less, more preferably 60 degrees or less, e.g. 45 degrees. An angle of 90 degrees would be perpendicular to the main direction of flow on the feed side of the spirally wound module. By tilting the strands away from that perpendicular direction the likelihood of contaminants accumulating at the strands is minimized.

The feed spacer can be made from woven threads. The thickness in this case is the thickness of the crossing points (bonds), approximately twice the thickness of the thread. Due to the difference in thickness at the crossing points and the strands in between, feed can easily pass along the feed side.

As a further advantage of the spirally wound membrane module over plate-and-frame modules it was found that the separation under comparable conditions removes more colour bodies, i.e. a lower colour index of the permeate is achieved. Without wanting to limit the invention in any manner, it is believed that the higher turbulence at the membrane feed side compared to a plate-and-frame module, caused by the presence of the feed spacer, helps to prevent concentration polarization at the feed side, and therefore minimizes the chance for colour bodies and/or asphalthenes to pass through the membrane.

The hydrocarbon mixtures will contain contaminants and/or colour bodies, which will give the hydrocarbon mixture a darkish colour. The process of this invention is not limited for use with feedstocks above a certain colour index. It was found to be particularly useful for hydrocarbon mixtures having an ASTM colour index above 2, in particular of 3 or more, as determined in accordance with ASTM D1500. The ASTM colour of the permeate is found to be lower than 2 and sometimes even lower than 1, depending on the colour of the hydrocarbon feed and operating conditions of the membrane separation process. The process of the present invention can result in a lowering of the dimensionless colour index by 10% or more, preferably by 30% or more, and most preferably by 50% or more.

The contaminants and/or colour bodies are typically hydrocarbons with high boiling points and which do not easily vaporise, even in the presence of steam. Examples of such hydrocarbons are polynuclear aromatics, polynuclear cycloparaffins, large paraffinic hydrocarbons (waxes), and olefinic components such as polynuclear cycloolefins and large olefinic hydrocarbons, especially diolefins. The contaminants that are removed by the present invention have typically 25 or more carbon atoms ($C_{25}+$), equivalent to a molecular weight of at least 350 Dalton. Typically only part of the lighter contaminants, e.g. in the range $C_{25}$-$C_{40}$, is removed by the membrane separation, e.g. 30% of the $C_{25}$ fraction, whereas heavier contaminants, e.g. $C_{40}+$, are nearly fully blocked (>95 wt %) by the membrane and are practically removed in the permeate. Due to the different nature of contaminants they contribute in different degrees to colour, generally the heavier contaminants add more to the colour than the lighter. The colour index increases with the concentration of the contaminants, and also generally with their average molecular weight.

The hydrocarbon mixtures to be used in the process according to the present invention are suitably hydrocarbon mixtures having an initial boiling point of greater than 20° C. and a 80% recovery point of less than 600° C., preferably a 95% recovery point of less than 600° C., more preferably with a 95% recovery point of less than 450° C., and even more preferable a 95% recovery point of less than 350° C. determined by ASTM D-2887. Such hydrocarbon mixtures can be crude petroleum fractions, (contaminated) natural gas condensates or (contaminated) refinery streams, but also crude oil such as a light crude is a possible feed. A particular example of a suitable hydrocarbon mixture is a naphtha (a straight-run gasoline fraction) and/or a gas oil (a distillate, intermediate in character between kerosene and light lubricating oils) fraction. The colour bodies can be contained in such a feed by its nature, but the feed can also have been contaminated in a storage tank or in a pipeline during transport, e.g. from a refinery to a steam cracker.

Another example of a hydrocarbon mixture, which may suitably be used, is the above referred to black condensate, which is a contaminated natural gas condensate. The natural gas condensates normally have an ASTM colour of below 1. Contamination occurs when such gas condensates are stored in storage vessels or transported via pipelines through which also, for example, crude oils are stored/transported. Contamination can also occur during production due to contact with heavier hydrocarbon streams, so called in-well or near-well contamination. Natural gas condensates are typically mixtures comprising substantially, i.e. more than 90 wt %, of $C_5$ to $C_{20}$ hydrocarbons or more typically $C_5$ to $C_{12}$ hydrocarbons.

A hydrocarbon mixture is a fluid mixture that contains at least 90 wt % hydrocarbons, preferably at least 95 wt % hydrocarbons. Hydrocarbons form a continuous phase of the mixture. If a small amount of water is present, suitably not more than 5%, this can be in the form of droplets and/or a small quantity of dissolved water.

The membrane suitably comprises a top layer made of a dense membrane and a base layer (support) made of a porous membrane. The membrane is suitably so arranged that the permeate flows first through the dense membrane top layer and then through the base layer, so that the pressure difference over the membrane pushes the top layer onto the base layer. The dense membrane layer is the actual membrane which separates the contaminants from the hydrocarbon mixture. The dense membrane, which is well known to one skilled in the art, has properties such that the hydrocarbon mixture passes said membrane by dissolving in and diffusing through its structure. Preferably the dense membrane layer has a so-called cross-linked structure as for example described in WO-A-9627430. The thickness of the dense membrane layer is preferably as thin as possible. Suitably the thickness is between 1 and 15 micrometer, preferably between 1 and 5 micrometer. The contaminants and colour bodies are not capable to dissolve in said dense membrane because of their more complex structure and high molecular weight. For example, suitable dense membranes can be made from a polysiloxane, in particular from poly(di-methyl siloxane) (PDMS). The porous membrane layer provides mechanical strength to the membrane. Suitable porous membranes are PolyAcryloNitrile (PAN), PolyAmideImide+$TiO_2$ (PAT), PolyEtherImide (PEI), PolyvinylideneDiFluoride (PVDF), and porous PolyTetraFluoroEthylene (PTFE), and can be of the type commonly used for ultrafiltration, nanofiltration or reverse osmosis.

The membrane is suitably an organophilic or hydrophobic membrane, so that water that may be present in the hydrocarbon mixture is predominantly retained in the retentate.

During separation the pressure difference across the membrane is typically between 5 and 60 bar and more preferably between 10 and 30 bar.

The present invention can be applied in parallel-operated (groups of) membrane separators comprise a single separation step, or in embodiments comprising two or more sequential separation steps, wherein the retentate of a first separation step is used as the feed for a second separation step.

The membrane separation is suitably carried out at a temperature in the range of from −20 to 100° C., in particular 10 to 100° C., and suitably in the range of 30-85° C. The wt % recovery of permeate on feed is typically between 50 and 97 wt % and often between 80 and 95 wt %.

The invention further relates to the use of a spirally wound membrane module for separating colour bodies and/or asphalthenic contaminants from a hydrocarbon mixture.

An example of a spirally wound membrane module is schematically shown in FIG. 1. The module 1 comprises a membrane assembly 5 that is formed of two rectangular membrane sheets 7,8 between which a permeate spacer sheet 9 is sandwiched. For the sake of clarity the membrane assembly 5 is shown opened up, but in fact the two membrane sheets 7,8 with the permeate spacer 9 in between are sealingly glued to each other along three sides as indicated by the glue 12. The membrane sheets 7,8 are formed of a dense top layer and a porous base layer support (not shown for the sake of clarity). The base layer is arranged at the side facing the permeate spacer 9.

The fourth side of the membrane assembly 5 is connected to a permeate outlet conduit 15 such that the area between the membranes is in fluid communication with the interior of the conduit, through openings 17 in the conduit. The permeate outlet conduit defines a longitudinal direction of the spirally wound module.

On top of membrane 7 a feed spacer sheet 20 is arranged, and the assembly 5 with feed spacer sheet 20 is rolled up around the permeate outlet conduit 15, to form a substantially cylindrical spirally wound membrane module. After rolling up, the feed spacer is sandwiched between the dense top layers forming the feed side of membranes 7,8.

The module is normally contained in a housing (not shown).

The module forms part of a membrane separation unit 30, which is also schematically indicated in FIG. 1. The unit receives feed at 34 that is pumped by a feed pump 36 to the feed side 40 of the membrane module 1, into which it enters along the feed spacer 20. Due to a pressure difference that is maintained between the feed side 40 and the permeate side (outlet 45 of the permeate conduit 15) of the membrane module 1, part of the feed passes through the membrane and flows along the permeate spacer 12 into the permeate outlet conduit 15 from which permeate 48 is removed at the outlet 45. The part of the feed that did not permeate is removed at the retentate outlet side 50 of the membrane module 1. Part of the retentate is recycled to the feed side via recycle conduit 54, and the remainder is removed at 56.

Figure 2:
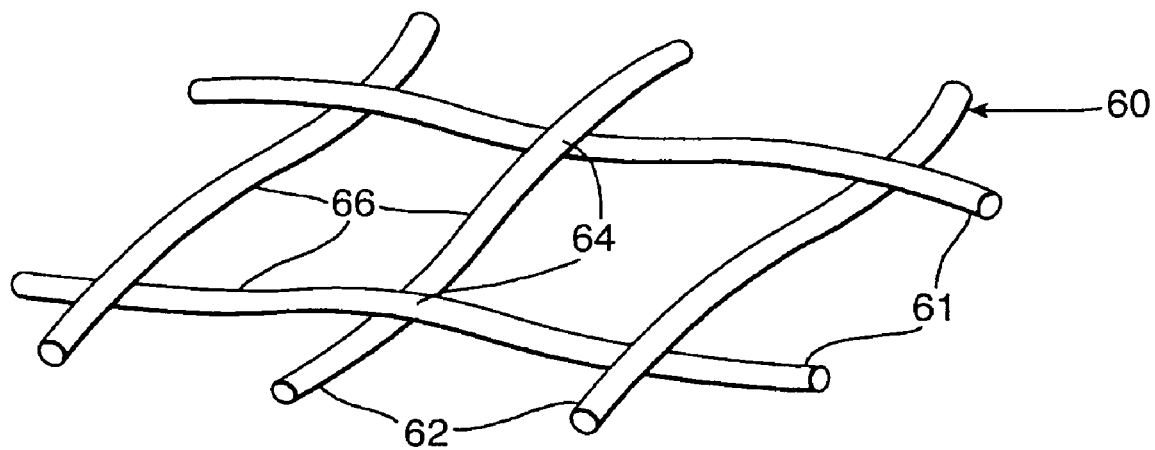
FIG. 2 shows schematically a feed spacer made from woven threads.

The feed and permeate spacers are made of a material that can withstand the conditions during use (temperature, pressure, chemical environment), such as a suitable polymer, but metal is also possible. As shown in FIG. 2, the feed spacer 60 can be made of woven polymer forming a nearly quadratic grid of openings. The thickness of the threads 61, 62 from which the spacer was woven is for example 1 mm, such that the thickness of the feed spacer, as determined by the corner points (bonds) 64 formed by two crossing threads, was 2 mm. The size of the openings is chosen such that the two membrane sheets do not contact each other under the influence of the pressure between feed and permeate sides. A typical characteristic length of the strands 66 between bonds 64 is 5-10 mm.

Figure 3A:
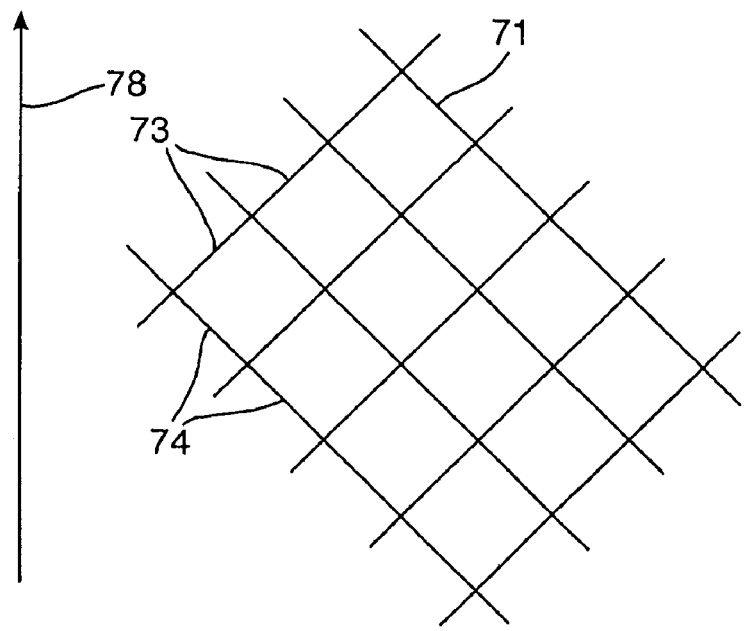
FIGS. 3a and 3b show schematically a feed spacer in two different orientations with respect to the main flow direction along the feed side of the membrane.

FIG. 3a shows schematically a feed spacer 71 with quadratic openings arranged such that the strands 73,74 form an angle of 45 degrees with the longitudinal direction 78 of the permeate outlet conduit and spirally wound module, which length direction is equivalent to the main flow direction on the feed side.

Figure 3B:
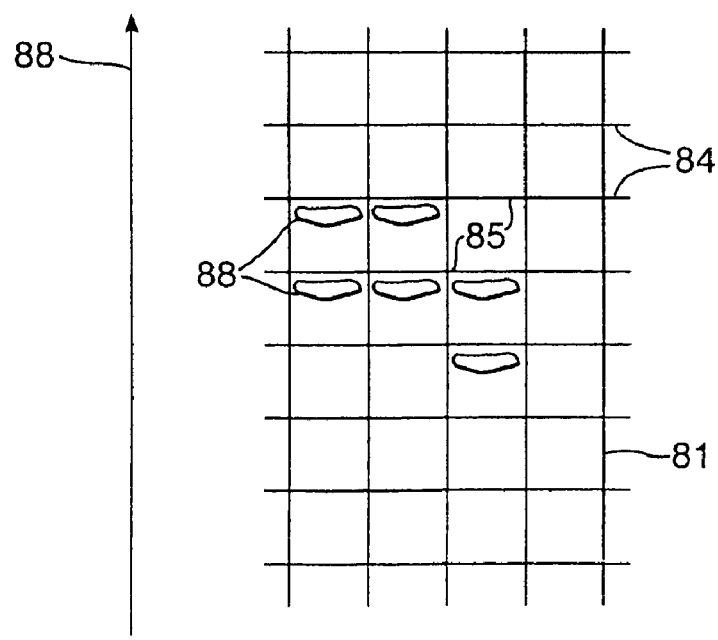

FIG. 3b shows a feed spacer 81 oriented such that the threads 84 (strands 85) have an orientation perpendicular to the flow direction. It is believed that such an orientation is more prone to contaminant deposition in the regions 88 just upstream of the strands 85. (Only a few of the regions 88 are indicated for the sake of clarity).

A conventional permeate spacer can be used. The permeate spacer is typically thinner than the feed spacer. Since the heaviest contaminants have been removed fouling is not a practical issue at the permeate side.

Example

A black condensate having the properties as listed in Table 1 was fed to a membrane separation unit. The separation unit contained 0.4 m² of total membrane surface. The membrane was arranged in a spirally wound membrane module in a so-called multi-leaf arrangement. Three equal membrane assemblies are arranged around the permeate outlet conduit, connected to the conduit at different positions around the circumference of the conduit, and rolled up with a feed spacer sheet between consecutive membrane assemblies, i.e. in total employing three feed spacer sheets. Apart from that, the membrane unit was generally arranged as discussed with reference to FIG. 1. As membrane a PDMS/PAN 150 membrane was used, as obtained from GKSS Forschungszentrum GmbH (a company having its principal office in Geesthacht, Germany) comprising a top layer of PolyDiMethylSiloxane (PDMS) and a supporting layer of a PolyAcryloNitrile (PAN). A feed spacer of 1.5 mm thickness was used, of which the strands were inclined with respect to the flow direction on the feed side.

Referring again to FIG. 1, the feed mixture was fed at a rate of 70 kg/hour to the membrane separation unit, wherein part of the retentate was recycled and mixed with fresh feed so that a permeate fraction ("stage cut") of 60% of the total feed was obtained. The feed mixture is passed from one end of the cylindrical module between the membrane assemblies, along the feed spacer sheet sandwiched between feed sides of the membranes.

Part of the feed mixture passes through either one of the membrane sheets to the permeate side, and permeate thus obtained flows along the permeate spacer sheet into the permeate outlet conduit from which it is removed.

The pressure difference over the membrane was 20 bar, wherein the pressure at the permeate side was nearly atmospheric. The operation temperature was 65° C. The colour properties of the permeate was an ASTM colour of less than 1.

Figure 4:
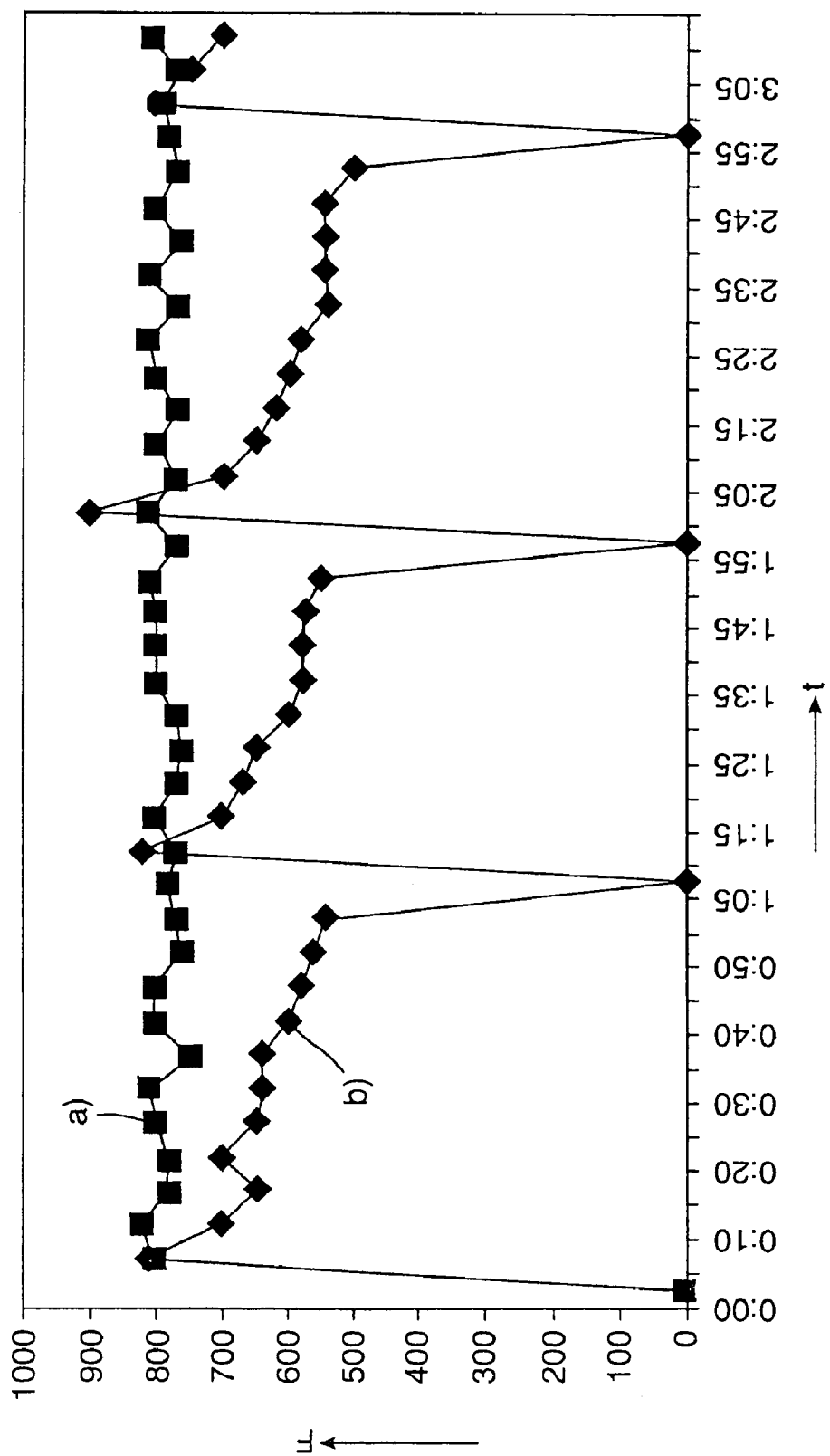
FIG. 4 shows permeate flux as a function of separation time for the example of using a spirally wound membrane module and the comparative example of a plate-and-frame module.

The total experiment time was 48 hours. Curve a in FIG. 4 shows the flux F of permeate (in kg/(m²·day) as a function of time t (hours). The flux did not measurably decline from an initial flux during the experiment time.

TABLE 1

| properties black condensate | |
| --- | --- |
| density at 15° C., kg/m³ | 776.9 |
| components not volatile at 343° C. | 17 wt % |
| components not volatile at 538° C. | 0.7 wt % |
| ASTM Colour (ASTM D1500) | 3 |

Comparative Example

The same feed was passed over a membrane unit equipped with a plate-and-frame membrane module wherein the same membrane was used. The membrane area was 1.5 m². The feed rate was also 70 kg/hr, and part of the retentate was recycled so that fluid flow rate to the feed side of the membrane module of 1000 kg/hr was provided. Temperature, differential pressure and permeation fraction obtained in this way were substantially the same as in the previous example.

The permeate flux data are also displayed in FIG. 4 as curve b). The permeate flux declines during normal separation significantly from a maximum value of ca. 820 kg/(m²·day), which is thought to be due to the deposition of colour bodies on the feed side of the membrane. To restore permeate flux, after every approximately 55 minutes of normal separation the flow of permeate was manually stopped by closing a valve in the permeate removal conduit for 5 minutes. During this time, the pressure at the permeate side was found to approach the pressure at the feed side to within 1 bar. Each time when the valve was reopened again after 5 minutes, permeate flux was resumed at about the original maximum flux value.

The permeate had an ASTM colour index of 1.5, i.e. the separation using the spirally wound membrane module according to the present invention removed more of the colour bodies than the separation using the plate-and-frame module.

Moreover it shall be clear from FIG. 4 that the average permeate flux obtained using the spirally wound module is significantly higher that with a plate-and-frame module.

It shall be understood that in the event that cleaning of the membrane module from deposits at the feed side should be necessary after a certain time of operation, this can be done by a method known in the art, for example by rinsing with a suitable chemical.

The process according to the invention is suitable to be used to separate contaminants from a feed, especially the referred to black condensates, for a steam or naphtha cracker of which WO-A-9927036 describes an example. The retentate which contains an increased concentration of contaminants may be supplied to the fractionation column downstream the steam cracker furnaces. Preferably the retentate is supplied to a crude distillation column of a refinery because the various components of the retentate are also found in the crude petroleum feedstock normally supplied to said crude distillation column.

Accordingly, the present invention further provides a process according to any one of claims 1-13, wherein the hydrocarbon mixture is a liquid hydrocarbon feed from which light olefins are to be produced by thermal cracking, wherein the membrane forms part of a membrane separation unit in which the hydrocarbon permeate is removed from the permeate side of the membrane, and wherein a retentate is removed from the retentate side of the membrane, and wherein the process further comprises the steps of:

(a) supplying the permeate to the inlet of a cracking furnace, allowing the permeate to crack in the coils of the cracking furnace in the presence of steam at elevated temperature and removing from the cracking furnace a cracked stream which is enriched in light olefins;

(b) quenching the cracked stream;

(c) supplying the cooled cracked stream to a fractionation column;

(d) removing the retentate, preferably by supplying it to the fractionation column or to a crude distiller; and (e) removing from the top of the fractionation column a gaseous stream, from the side of the fractionation column a side stream of fuel oil components and from the bottom of the fractionation column a bottom stream.

Thus, using the present invention the known process is improved in order that it can be operated over a significantly prolonged time period at a high average flux. This is achieved by replacing the feed supply and membrane separation step of the known process by the step of supplying the feed to the inlet of a membrane unit provided with a membrane, over which membrane a pressure difference is maintained, thereby obtaining at the permeate side of the membrane a permeate having a reduced content of colour bodies and/or contaminants, and at the retentate side of the membrane a retentate, and removing the permeate and the retentate from the membrane, wherein during selected time intervals the removal of hydrocarbon permeate from the permeate side of the membrane is stopped so that the pressure difference over the membrane is temporarily substantially lowered.

Suitably, the membrane in step (a) comprises a dense membrane layer as described hereinbefore, which allows hydrocarbons from the feed, but not asphalthenes or colour bodies to pass through the membrane by dissolving in and diffusing through its structure. Such a membrane is suitably also used when the hydrocarbon feed further contains salt contaminants, which are present in water droplets that are dispersed in the hydrocarbon feed. Salt contaminants can come from formation water or from other treatments at a refinery, examples of contaminating salts are sodium chloride, magnesium chloride, calcium chloride and iron chloride. Other salts, such as sulphates may be present as well. The water and/or salt will normally not be dissolved in the dense membrane, and therefore the permeate will be free from salt.

Details and ranges of operation parameters for the membrane are given in the description hereinbefore and in the example. Details about the cracking process, feeds used and products obtained are disclosed in WO-A-9927036, in particular in the example.

What is claimed is:

1. A process for continuously separating colour bodies and/or asphalthenic contaminants from a hydrocarbon mixture having an initial boiling point greater than 20° C. using a membrane having a feed side and a permeate side, by contacting the hydrocarbon mixture with the feed side of the membrane, and by removing at the permeate side a hydrocarbon permeate having a reduced content of colour bodies and/or asphaltenic contaminants, wherein the membrane is arranged in a spirally would membrane module; wherein the spirally wound membrane module comprises a feed spacer having a thickness of at least 1.0 mm; and wherein said separation process is continuously conducted for at least 10 hours.

2. A process according to claim 1, wherein the process is conducted continuously for at least one day.

3. A process according to claim 2, wherein the feed side is only cleaned if the flux of permeate through the membrane during continuous operation has diminished to 70% or less of an initial flux.

4. A process according to claim 1, wherein the spirally wound membrane module has a longitudinal direction, and comprises a feed spacer representing a grid of openings defined by strands and bonds, wherein the strands form an angle of 80 degrees or less with the longitudinal direction.

5. A process according to claim 1, wherein the spirally wound membrane module comprises a woven feed spacer.

6. A process according to claim 1, wherein the membrane comprises a top layer made of a dense membrane and a support layer made of a porous membrane.

7. A process according to claim 1, wherein the dense membrane is made from a polysiloxane such as a poly(di-methyl siloxane).

8. A process according to claim 1, wherein the pressure difference across the membrane during separation is between 10 and 30 bar.

9. A process according to claim 1, wherein the membrane is operated at a temperature of at least 30° C.

10. A process according to claim 1, wherein the hydrocarbon mixture has an ASTM colour of above 2, according to ASTM D1500.

11. A process according to claim 1, wherein the concentration of colour bodies and/or asphalthenic contaminants in the hydrocarbon mixture is 1 wt % or more.

12. A process according to claim 1, wherein the hydrocarbon mixture is a contaminated natural gas condensate or a contaminated refinery stream.

13. A process according to claim 1, wherein the hydrocarbon mixture is a liquid hydrocarbon feed from which light olefins are to be produced by thermal cracking,
wherein the membrane forms part of a membrane separation unit in which the hydrocarbon permeate is removed from the permeate side of the membrane, and
wherein a retentate is removed from the retentate side of the membrane, and
wherein the process further comprises the steps of:
(a) supplying the permeate to the inlet of a cracking furnace, allowing the permeate to crack in the coils of the cracking furnace in the presence of steam at elevated temperature and removing from the cracking furnace a cracked stream which is enriched in light olefins;
(b) quenching the cracked stream;
(c) supplying the cooled cracked stream to a fractionation column;
(d) removing the retentate; and
(e) removing from the top of the fractionation column a gaseous stream, from the side of the fractionation column a side stream of fuel oil components and from the bottom of the fractionation column a bottom stream.

14. A process according to claim 1, wherein the spirally wound membrane module has a longitudinal direction, and comprises a feed spacer representing a grid of openings defined by strands and bonds, wherein the strands form an angle of 70 degrees or less with the longitudinal direction.

15. A process according to claim 14, wherein the hydrocarbon mixture contains at least 5 wt % of said contaminants of colour bodies and/or asphalthenic contaminants.

16. A process according to claim 15, wherein the hydrocarbon mixture is selected from the group consisting of crude petroleum fractions, contaminated natural gas condensates, and contaminated refinery streams.

17. A process according to claim 16, wherein the strands form an angle of 60 degrees or less with the longitudinal direction.

18. A process according to claim 16, wherein the hydrocarbon mixture contains at least 10 wt % of said contaminants of colour bodies and/or asphalthenic contaminants.

19. A process according to claim 1, wherein the process is conducted continuously for at least one week.

* * * * *